Dec. 22, 1964 R. R. STONE, JR 3,162,812

NARROW BAND FSK SYSTEM EMPLOYING STABILIZED FREQUENCY CONTROL

Filed Aug. 31, 1962

INVENTOR.
ROBERT R. STONE, JR.

BY Glenn S. Orrevik, Agent
Richard Reed
ATTORNEY 3,162,812

NARROW BAND FSK SYSTEM EMPLOYING STABILIZED FREQUENCY CONTROL

Robert R. Stone, Jr., Rosecroft Park, Md., assignor to the United States of America as represented by the Secretary of the Navy Filed Aug. 31, 1962, Ser. No. 220,924
1 Claim. (Cl. 325—163)
(Granted under Title 35, U.S. Code (1952), sec. 266)

The invention described herein may be manufactured and used by or for the Government of the United States of America for governmental purposes without the payment of any royalties thereon or therefor.

This invention relates in general to pulse communication systems operating in the VLF range and in particular to such systems embodying frequency shift keying.

The reliability of low and very low frequencies for long distance communication has been repeatedly demonstrated since the inception of radio communication. As is well known in the art, communication at such frequencies is not greatly susceptible to the effects of solar disturbances and consequent ionospheric storms and the increased skin depth in semiconductors at such frequencies permits transmission to submerged stations.

With the advent of supersonic aircraft, missiles, and space vehicles the pressing need for more efficient and reliable use of the low end of the radio spectrum has become increasingly more evident and has given rise to communications systems in which transmission time is utilized to the greatest possible extent.

It is generally recognized that frequency shift keying affords optimum time utilization of signal transmission and that it is desirable to employ this type of keying in most pulse coded communication systems.

Heretofore, particularly in stabilized frequency systems wherein precise selected phase relationship between stations is a critical requirement, phasing difficulties have retarded the adaption of frequency shift keying to VLF applications. In particular, when switching from one frequency to another, having different rotational rates, a phase discontinuity between the two signals at the time of switching which generates unwanted sidebands has presented a major obstacle to the adaption of FSK to VLF applications. These sidebands greatly restrict the use of frequency shift keying in narrow band systems. For example, if 2 milliseconds is the time allotted in which the phase discontinuity must be corrected, then 180° in 2 milliseconds=220 cycles, or
90° in 2 milliseconds=110 cycles, or
45° in 2 milliseconds=55 cycles.

Obviously, in a system having a bandpass of 55 cycles, any phase discontinuity greater than 45° would result in distortion of the keying waveform.

It will be appreciated that a stabilized frequency shift keying means adaptable to narrow band VLF application is needed and would be welcomed as a substantial advancement of the art.

Accordingly, it is an object of this invention to provide a frequency shift keying means having stabilized frequencies at the "mark" and "space" positions.

It is another object of this invention to provide a frequency shift keying means adaptable for use in narrow band applications.

It is still another object of this invention to provide a frequency shift keying means adaptable for use in narrow band VLF applications.

Other objects of this invention will become apparent upon a more comprehensive understanding of the invention for which reference is had to the following specification and drawings wherein.

Figures 1, 2:
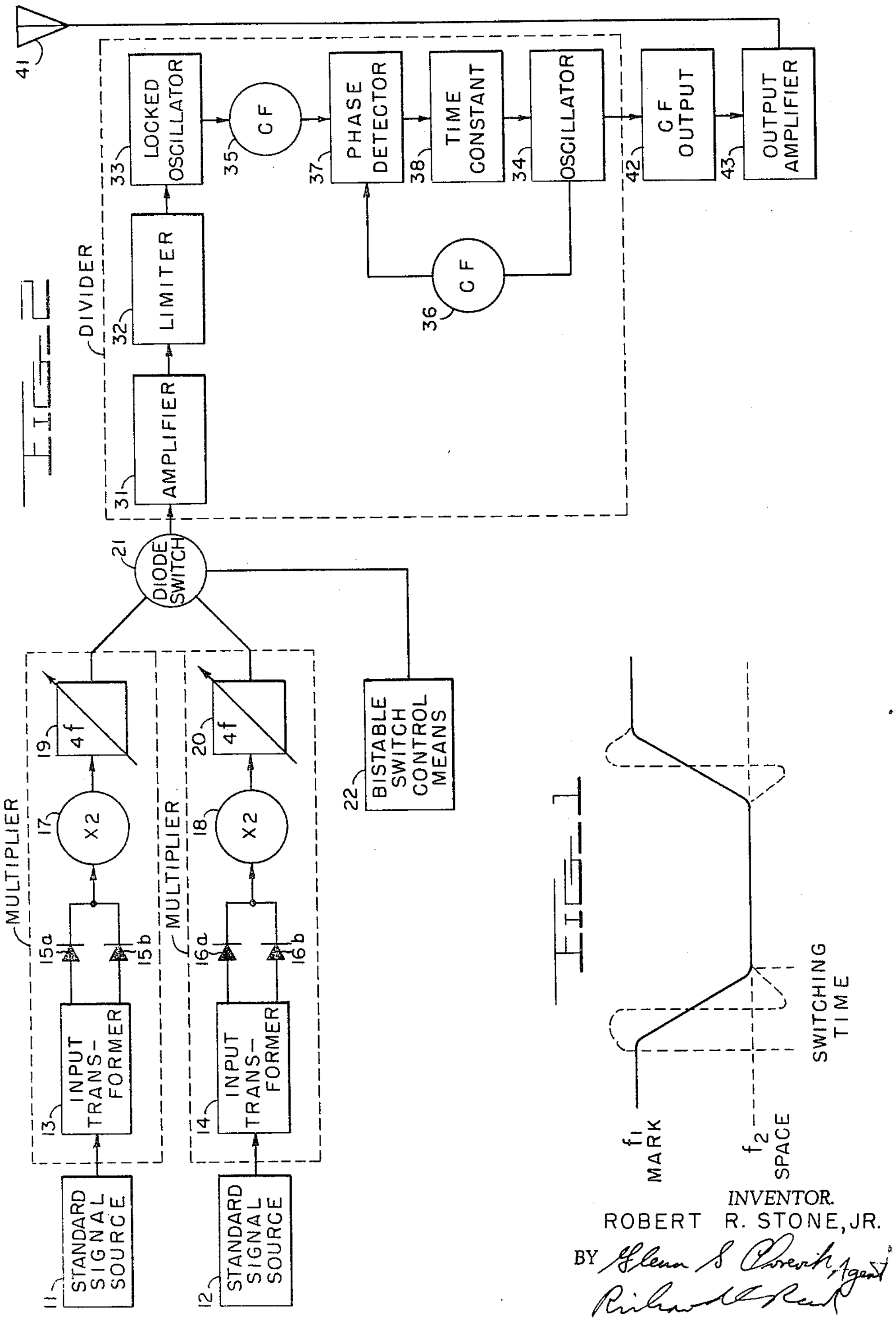
FIG. 1 is a graphical showing of an undesirable effect of phase discontinuities which the present invention alleviates.
FIG. 2 is a block diagram of the FSK transmitter means of this invention in a VLF embodiment.

Briefly, the device of the present invention is a standard frequency FSK means useful over a wide range of frequencies and particularly adaptable to VLF operation in which the two transmitted frequencies undergo multiplication and then division with the divider system designed for instantaneous lock-in of the input signal thereto at the nearest point of phase. In a preferred embodiment means are provided for avoiding transients which are developed due to the instantaneous nature of the lock-in action.

Referring now to the drawings:

FIG. 1 is a graphical presentation of the two frequency output of a typical FSK transmitter which is illustrative of the phase discontinuity difficulty common in the prior art which becomes of paramount importance during VLF operation. In FIGURE 1, the switching time, between "mark" and "space" frequencies, represents a "region of uncertainty" during which the two cannot be distinguished. It will be appreciated that there is a maximum keying speed above which the "region of uncertainty" becomes too large a fraction of the total keying period. This maximum keying speed depends, of course, largely on the type of signal receiving equipment employed.

As indicated in the drawing, sidebands are generated by phase discontinuity during the switching period. In applications involving a relatively wide bandpass such as generally encountered in high frequency operation, these phase discontinuity generated sidebands are usually of little consequence. In present day VLF application, however, a narrow bandpass is generally inherent in the system due to the relatively high Q of the antenna. At VLF sideband frequencies must be minimized to avoid distortion of the keying waveform. For a Q of about 300, it has been found that phase discontinuities should be no greater than 45 degrees as a general rule. It will be appreciated, of course, that a greater or lesser phase discontinuity limitation may exist in selected applications.

FIG. 2 is directed to a preferred embodiment of the FSK transmitter means of this invention wherein the two frequencies to be transmitted are sufficiently stabilized to permit operation in the VLF range. In FIG. 2, two frequency sources 11 and 12 having output frequencies $F_1$ and $F_2$ respectively are each connected to diode bistable switch means 21 via respective frequency multiplier means wherein the output frequency is multiplied by a factor X, in this embodiment, four.

The frequency multiplier means is composed of standard components. Input transformers 13 and 14 receive frequencies $F_1$ and $F_2$, respectively. These signals are then fed through full wave rectifiers shown as diodes 15*a*, 15*b*, 16*a* and 16*b*. The rectified signals are then fed through times-two multipliers, shown as 17 and 18 in the figure. The multipliers supply these signals to tuned circuits 19 and 20, which have the function of cleaning up the signals and thus provide sine waves of four times the output frequency of the signals as generated by sources 11 and 12. It should be noted that the full wave rectifiers 15 and 16 provide a times-two frequency multiplication.

The diode bistable switch 21 is controlled by bistable switch control means 22, which may be an electromechanical keying device operative in response to a keying voltage, for example. The output of bistable switch means 21, alternately $4F_1$ and $4F_2$ is applied via amplifier 31 and limiter 32, for example, to locked oscillator divider means 33. Locked oscillator divider means 33 may be any conventional or otherwise oscillator divider means which will instantaneously lock in its input signal to the nearest point of phase. For example, the locked oscillator divider means 33 may be of the conventional Hartley or Colpitts variety, if desired.

In the illustrative embodiment of FIG. 2, the output of locked oscillator means 33, alternately $F_1$ or $F_2$, feeds oscillator 34 by means of cathode follower 35, phase detector 37 which is also connected to the output of oscillator 34 via cathode follower 36, and time constant means 38. It will be appreciated that phase detector 37, time constant means 38, and the oscillator 34 form a servo controlled system in the nature of a phase-locked oscillator which effectively lengthens the time period of the "instantaneous" phase correction provided by lock-in oscillator 33 thereby eliminating any transients caused by the sudden lock-in. Phase detector 37 detects the difference in phase in the signals applied thereto from locked oscillator 33 and oscillator 34, developing an error or correction signal in proportion to the difference in phase between the signals of these two oscillators. This error signal is applied to oscillator 34 at a rate determined by time constant means 38. The output of oscillator 34 is applied to the antenna 41 via cathode follower 42 and output amplifier 43.

It will be appreciated, of course, that the specific servo controlled oscillator disclosed in the embodiment of FIG. 2 is not critical to the invention and that a wide variety of means for spreading transient time over a selected period may be substituted, if desired. For example, if linear control is not required, a narrow bandpass filter might be substituted for the servo controlled oscillator.

Furthermore, while it has been found to be desirable to employ a servo controlled oscillator 34 or the like for most applications of the invention, it will be appreciated that in other applications, for example, where the multiplication factor X is large and the optimum correction by oscillator 33 is small, it is within the purview of this disclosure to delete the oscillator 34 entirely and to apply the output of locked oscillator divider 33 to the antenna 41.

Moreover, it is understood that the several cathode follower means incorporated in the connection of selected components in the illustrative embodiments of FIG. 2 are not essential to the invention and that, as an alternative, a direct connection may be employed, if desired.

Likewise, while the factor 4 is employed in the illustrative embodiment of FIG. 2, and as discussed in connection therewith, is considered optimum in many applications where phase discontinuities up to 45 degrees would be permissible, it is understood that other factors may be employed utilizing the teaching of this invention without substantial variation in requisite structure or operation.

Further, it is understood that various modifications well known in the art may be incorporated in the device of this invention in conventional manner, if desired. In particular, selected signal monitoring equipment may be incorporated and may be utilized as required for compensation purposes either by manual or automatic correction.

Finally, it is understood that the device of this invention is only to be limited by the scope of the claim appended hereto.

What is claimed is:

A frequency shift keyer for VLF communication, comprising:

a first full wave rectifier;
a first transformer to receive and couple a signal source to said first full wave rectifier;
a first constant factor frequency multiplier connected to and receiving the output from said first full wave rectifier and multiplying this received signal by a preselected factor;
first tuned circuit means connected to said first constant factor frequency multiplier to convert the rectified signal received from said multiplier into a sine wave of the frequency determined by said multiplier;
a second full wave rectifier;
a second transformer to receive and couple a signal source to said second full wave rectifier;
a second constant factor frequency multiplier connected to and receiving the output from said second full wave rectifier and multiplying this received signal by a preselected factor;
second tuned circuit means connected to said second constant factor frequency multiplier to convert the rectified signal received from said multiplier into a sine wave of the frequency determined by said multiplier;
a diode switch;
switch control means connected to said diode switch to activate same in response to an external switching signal,
said diode switch connected to and alternately switching the output signals from said first and second tuned circuit means;
a locked oscillator coupled to said diode switch and dividing the frequency of the signals alternately received therefrom by a factor preselected such that the frequency of these signals is reduced to that of the signals received by said first and second transformers;
limiter means connected to and controlling the amplitude of the signals supplied to said locked oscillator;
amplifier means coupling the alternately gated signals from said diode switch to said limiter means;
a phase detector connected to said locked oscillator to receive the alternate signal outputs therefrom as a first input;
an oscillator connected to said phase detector to provide a second input thereto,
said phase detector producing a correction signal proportional to the phase difference between said first and second input signals thereto;
time constant means coupling said phase detector to said oscillator,
said time constant means controlling the rate at which said correction signal is applied to said oscillator,
whereby the transients caused by the instantaneous lock-in of said locked oscillator are eliminated by the rate-controlled lock-in of said oscillator.

References Cited by the Examiner

UNITED STATES PATENTS

| | | | |
|---|---|---|---|
| 2,250,284 | 7/41 | Wendt | 331—21 |
| 2,437,609 | 3/48 | Mayle | 331—21 |
| 2,474,354 | 6/49 | Guanella | 325—184 |
| 2,712,061 | 6/55 | McClellan | 325—163 |
| 2,930,001 | 3/60 | Salmet | 331—17 |
| 2,982,921 | 5/61 | Rozner et al. | 331—21 |
| 3,031,527 | 4/62 | Barton et al. | 178—66 |

DAVID G. REDINBAUGH, *Primary Examiner.*